(12) United States Patent
Takai

(10) Patent No.: US 6,337,134 B1
(45) Date of Patent: Jan. 8, 2002

(54) PROCESS FOR PRODUCING EPOXIDIZED ORGANIC POLYMER, THERMOPLASTIC RESIN COMPOSITION, PRIMER COMPOSITION, UNVULCANIZED RUBBER COMPOSITION, RUBBER MOLDINGS, AND PROCESS FOR PRODUCING THE MOLDINGS

(75) Inventor: Hideyuki Takai, Otake (JP)

(73) Assignee: Daicel Chemical Industries Ltd, Osaka (JP)

( * ) Notice: Subject to any disclaimer, the term of this patent is extended or adjusted under 35 U.S.C. 154(b) by 0 days.

(21) Appl. No.: 09/427,071

(22) Filed: Oct. 26, 1999

Related U.S. Application Data

(62) Division of application No. 08/894,146, filed on Aug. 13, 1997, now Pat. No. 6,031,054.

(30) Foreign Application Priority Data

Dec. 14, 1995 (JP) .............................................. 7-347015
Mar. 15, 1996 (JP) .............................................. 8-87157
Jun. 7, 1996 (JP) .............................................. 8-168202

(51) Int. Cl.$^7$ .............................................. B32B 27/38
(52) U.S. Cl. .................... 428/413; 428/516; 525/331.7; 525/530
(58) Field of Search .............................. 525/331.7, 530; 428/413, 516

(56) References Cited

U.S. PATENT DOCUMENTS

| | | |
|---|---|---|
| 3,043,818 A | 7/1962 | Tocker |
| 4,131,725 A | 12/1978 | Udipi |
| 4,341,672 A | 7/1982 | Hsieh et al. |
| 4,742,106 A | 5/1988 | Kamiya et al. |
| 4,769,403 A | 9/1988 | Luise |
| 4,769,416 A | 9/1988 | Gelling et al. |
| 4,855,355 A | 8/1989 | Hirai et al. |
| 4,861,828 A | 8/1989 | Waggoner |
| 4,897,447 A | 1/1990 | Williams |
| 4,956,501 A | 9/1990 | Sunseri et al. |
| 5,128,086 A * | 7/1992 | Tomko .................. 264/272.11 |
| 5,202,384 A | 4/1993 | Pyke et al. |

FOREIGN PATENT DOCUMENTS

| | | |
|---|---|---|
| EP | 0149192 | 7/1985 |
| EP | 0504742 | 9/1992 |
| GB | 2113692 | 8/1983 |
| JP | 60168750 | 9/1985 |
| JP | 62-21027 | 5/1987 |
| JP | 63-54312 | 10/1988 |
| JP | 3-161329 | 7/1991 |
| JP | 04004204 | 1/1992 |
| JP | 4-258643 | 9/1992 |
| JP | 5-237448 | 9/1993 |
| JP | 07150107 | * 6/1995 |
| JP | 7-150107 | 6/1995 |
| WO | WO9218570 | 10/1992 |
| WO | WO 9307185 | 4/1993 |

OTHER PUBLICATIONS

Patent Abstracts of Japan, vol. 017, No. 659 (C–1137), Dec. 7, 1993 & JP 05 214014 A (Maruzen Polymer KK), Aug. 24, 1993.

Patent Abstracts of Japan, vol. 095, No. 009, Oct. 31, 1995, & JP 07 150107 A (Nippon B Chem KK), Jun. 13, 1995.

Patent Abstracts of Japan, vol. 017, No. 042 (C–1020), Jan. 26, 1993 & JP 04 258643 A (Shinto Paint Co Ltd), Sep. 14, 1992.

Xigao Jain: "Expoxidationof Unsaturated Polymers With Hydrogen Peroxide" Journal of Polymer Science Part C: Polymer Letters, vol. 28, No. 9, Aug. 1990, pp. 285–288, New York, US.

* cited by examiner

Primary Examiner—Robert Dawson
Assistant Examiner—D. Aylward

(57) ABSTRACT

A process for preparing an epoxidized organic polymer by dispersing or suspending a solid organic polymer in an organic solvent and epoxidizing the dispersed or suspended polymer with a peroxide. The epoxidized polymer thus obtained is usable for coating materials, resin modifiers, rubber modifiers or adhesives, thus being extremely useful. The epoxidized organic polymer is useful to prepare a thermoplastic resin composition having improved mechanical strength, and comprising a thermoplastic resin, an epoxidized EPDM and an acid anhydride. The thermoplastic composition can be used to prepare a primer composition including a 100 parts by weight of an epoxidized EPDM and 50 to 70 parts by weight of a product of chlorination of a polyolefin modified with an unsaturated carboxylic acid or an anhydride thereof. An unvulcanized rubber composition can be prepared for the epoxidized EPDM, a diene polymer and a vulcanizing agent, and the unvulcanized rubber composition can be used in a process for producing rubber moldings by extruding the unvulcanized rubber composition and vulcanizing the extrudate.

11 Claims, No Drawings

PROCESS FOR PRODUCING EPOXIDIZED
ORGANIC POLYMER, THERMOPLASTIC
RESIN COMPOSITION, PRIMER
COMPOSITION, UNVULCANIZED RUBBER
COMPOSITION, RUBBER MOLDINGS, AND
PROCESS FOR PRODUCING THE
MOLDINGS

This application is a division of Ser. No. 08/894,146 filed Aug. 13, 1997 now U.S. Pat. No. 6,031,054 to which applicants claim priority. Applicants also claim priority to their PCT/JP96/03659 filed Dec. 13, 1996 and to their related earlier filed Japanese applications.

The application Ser. No. 08/894,146 issued as USP 6,031,054 on Feb. 29, 2000.

TECHNICAL FIELD

The present invention relates to a process for producing an epoxidized organic polymer which may be used for the preparation of paints, resin modifiers, rubber modifiers, adhesives, etc. More particularly, the invention relates to a process for producing an epoxidized organic polymer in which carbon-carbon double bonds (hereinafter referred to simply as "double bonds") present in the molecular chain of the organic polymer are oxidized with the organic polymer in a dispersed or suspended state in a solvent, to thereby simplify post-treatment.

The present invention also relates to use of an epoxidized organic polymer, an epoxidized ethylenepropylene dieneterpolymer (hereinafter ethylenepropylene dieneterpolymer is referred to as EPDM), which use includes thermoplastic resin compositions having improved mechanical strength which are obtained by incorporating epoxidized EPDM and acid anhydrides into a variety of thermoplastic resins and heating the resultant mixture, as well as to primer compositions formed of EPDM, more particularly, primer compositions which are endowed with excellent adhesion to both top coats and polyolefin moldings such as polypropylene bumpers and with excellent paint storage stability.

The present invention also relates to an unvulcanized rubber composition which is formed of an epoxidized EPDM and a diene polymer and is endowed with excellent coating ability, to rubber moldings formed of the composition, and to a process for producing the moldings.

BACKGROUND ART

Hitherto, there have been known the following processes for the transformation of an organic polymer into an epoxidized organic polymer through oxidation:
(1) a process in which percarboxylic acid is prepared in advance by reacting hydrogen peroxide with a lower carboxylic acid such as formic acid or acetic acid, and the percarboxylic acid is added to the reaction system as an epoxidizing agent so as to cause an epoxidizing reaction in the presence or absence of a solvent, and
(2) a process in which epoxidizing reaction is caused by use of hydrogen peroxide in the presence of a catalyst such as an osmate or tungstic acid, and a solvent. These processes are both characterized in that an organic polymer to be epoxidized is dissolved in a solvent so as to carry out epoxidized reaction effectively, and the synthesized epoxidized organic polymer is recovered by desolvating treatment.

According to these processes, if the organic polymer to be epoxidized is in a liquid state or paste state, the resultant epoxidized organic polymer is also in a liquid or paste state, and therefore, the latter can be readily recovered by a desolvating procedure. However, if in a solid state, the reaction mixture is subjected to a desolvating procedure to cause the epoxidized organic polymer to precipitate in a solid state, and this precipitation and recovering operation for the epoxidized product is very difficult. Particularly when the organic polymer to be epoxidized is a rubber polymer, the synthesized epoxidized organic polymer becomes viscous to considerably reduce workability.

Under the above circumstances, a process for producing epoxidized organic polymers which involves a simplified post-treatment is desired.

In the meantime, Japanese Patent Application Laid-Open (kokai) No. 60-168750 discloses a thermoplastic polyester which contains epoxidized EPDM as an agent to improve impact resistance. Yet, improvement of impact resistance of general thermoplastic resins, including thermoplastic polyesters, is still desired.

Conventional primers for polypropylene are 1described, for example, in Japanese Patent Publication (kokoku) No. 63-54312, which discloses primers obtained through graft-polymerization of maleic anhydride to a chlorinated polypropylene resin; and in Japanese Patent Publication (kokoku) No. 62-21027, which discloses primers obtained through graft-polymerization of maleic anhydride to a polypropylene/ethylene copolymer. Moreover, Japanese Patent Application Laid-Open (kokai) No. 4-258643 discloses primers having improved adhesion, which is attained by co-use of a chlorinated polypropylene resin and any one of a sorbitol epoxy resin, glycol-ether-type epoxy resin, or a bisphenol epoxy resin. In addition, Japanese Patent Application Laid-Open (kokai) No. 7-150107 discloses primers containing a butadiene epoxy resin in a graft polymer formed of chlorinated polypropylene and maleic anhydride.

However, of the above-mentioned primer compositions, those disclosed in Japanese Patent Publication (kokoku) Nos. 63-54312 and 62-21027 and Japanese Patent Application Laid-Open (kokai) No. 4-258643 do not exhibit sufficient adhesive properties when they are tested for waterproofness and antihygroscopic properties, unless they are pre-treated by cleaning with trichloroethane vapor. The primer compositions disclosed in Japanese Patent Application Laid-Open (kokai) No. 7-150107 also has the same problem, if there remain mold releasing agents used at the time of molding. Such a case requires wiping with a solvent such as isopropyl alcohol or toluene or similar steps. Washing with aqueous substances in turn requires a facility enabling many cleaning steps, such as so-called power-wash, which results in considerably high facility costs and cleaning costs.

Regarding techniques related to unvulcanized rubber compositions, Japanese Patent Application Laid-Open (kokai) No. 3-161329 discloses a process for producing a rubber composition suitable for weather strips. The technique disclosed in that publication is characterized by the following. An adhesive layer of a nitrile rubber/EPDM blend is formed on the glass portion of the main body of glassrun made of EPDM. Upon formation of the adhesive layer, an extruder that extrudes a glassrun main body and another extruder that extrudes an adhesive layer are connected to a multi-color extrusion head, to thereby effect co-extrusion. Subsequently, the adhesive layer on the glass portion of the glassrun main body of the thus-extruded molding is coated with a urethane paint by way of a conventional method such as flow coating or brushing, and then vulcanized.

However, since the process disclosed in that publication employs independent extruders for performing extrusion of the glass portion of the glassrun main body and extrusion of the adhesive layer, facility costs rise. Moreover, since a urethane paint is required to be applied through a customary method onto the extrudate that has left the extruder and not yet been vulcanized, the coating means cannot contact the glassrun main body, and therefore, particularly in the case in which the molded product has a cross section that is difficult to unfold, there exist portions that cannot be easily coated. Independently, Japanese Patent Application Laid-Open (kokai) No. 5-237448 discloses a technique for improving coating properties by the incorporation of EPDM and polyglycidyl methacrylate into a rubber composition. However, there is desired development of a technique that uses fewer ingredients, eliminates use of polyglycidyl methacrylate, and still provides excellently improved coating properties.

DISCLOSURE OF THE INVENTION

The present inventors have found that when an epoxidizing agent is applied to a solid organic polymer which has been dispersed or suspended in an organic solvent, the polymer is epoxidized satisfactorily, and epoxidized organic polymer can be obtained with a simplified post-treatment. The present invention was accomplished based on this finding.

Moreover, the inventors have found that a thermoplastic composition having improved strength can be obtained by incorporating into a thermoplastic resin an epoxidized EPDM which is an epoxidized organic polymer and an organic compound having a functional group that reacts with an epoxy group, such as an acid anhydride, and heating the resultant material. The present invention was accomplished based also on this finding.

Moreover, the inventors have found that a primer composition containing an epoxidized EPDM which is an epoxidized organic polymer which has excellent adhesion to polyolefin and a topcoat, excellent paint storage stability, and excellent adhesion even when a mold releasing agent is contaminated. The present invention was accomplished based also on this finding.

In addition, the inventors have found that an unvulcanized rubber composition having excellent coating properties can be obtained in the absence of polyglycidyl methacrylate, if an epoxidized EPDM and a diene polymer are incorporated. The present invention was accomplished based also on this finding.

Accordingly, the present invention provides a process for preparing an epoxidized organic polymer, characterized by dispersing or suspending a solid organic polymer in an organic solvent and epoxidizing the dispersed or suspended polymer with a peroxide.

The present invention also provides a composition comprising an epoxidized EPDM which is an epoxidized organic polymer, an organic compound that reacts with an epoxy group, such as an acid anhydride, and a thermoplastic resin.

The present invention also provides a primer composition characterized by comprising 100 parts by weight of an epoxidized EPDM which is an epoxidized organic polymer and 50 to 70 parts by weight of a chlorination product of a polyolefin modified with an unsaturated carboxylic acid or an anhydride thereof.

In addition, the present invention provides an unvulcanized rubber composition comprising an epoxidized EPDM, a diene polymer, and a vulcanizing agent. Still additionally, the present invention provides a process for producing rubber moldings, characterized by extruding the unvulcanized rubber composition and subsequently vulcanizing the extrudate.

BEST MODES FOR CARRYING OUT THE INVENTION (Preparation of an Epoxidized Organic Polymer)

According to the process of the present invention for the preparation of the epoxidized organic polymer, a solid resin or a solid rubber polymer is used as the solid organic polymer (hereinafter referred to as an organic polymer to be epoxidized). The resin or rubber polymer is not particularly limited so long as it has a double bond in the molecule. Thus, both homopolymers and copolymers of two or more monomers may be used. The process of the present invention is particularly useful when the organic polymer to be epoxidized is a rubber polymer.

Specific examples of homopolymers include polybutadiene (BR), polyisoprene rubber, polynorbornene (rubber), polybutylene, and dicyclopentadiene resins and cyclopentadiene resins which are polymers of alicyclic diene monomers.

Illustrative examples of monomers that constitute the above-mentioned copolymers include vinyl aromatic hydrocarbons, diene compounds, olefin compounds, and other copolymerizable monomers.

Examples of vinyl aromatic hydrocarbons include styrene, alkyl-substituted styrenes such as alpha-methyl styrene, alkoxy-substituted styrenes, vinyl naphthalene, alkyl-substituted vinylnaphthalenes, divinylbenzene, and vinyltoluene.

Examples of diene compounds include 1,3-butadiene, isoprene, 1,3-pentadiene, 2,3-dimethyl-1,3-butadiene, piperylene, 3-butyl-1,3-octadiene, and phenyl-1,3-butadiene. Moreover, mention may be given of those diene compounds having an alicyclic skeleton such as dicyclopentadiene, cyclopentadiene, and ethylidenenorbornene.

Examples of olefin compounds include ethylene and propylene.

Examples of other copolymerizable monomers include acrylonitrile.

The organic polymer to be epoxidized that is used in the present invention may be a copolymer of two or more copolymerizable monomers mentioned above. The copolymers may be either random or block copolymers.

In the present invention, when the copolymers are random copolymers, they are preferably EPDMs (ethylenepropylene dieneterpolymers). This is because EPDMs do not dissolve in a solvent such as an acetic ester or ketone, thus allowing the solvent to penetrate inside the polymers for effecting epoxidization.

The iodine value of EPDMs is preferably 5-100, particularly preferably 10-50. Iodine values in excess of 100 result in poor compatibility with thermoplastic resins such as polyethylene and polypropylene, allowing the crosslinking density to rise excessively, which may invite deteriorated rubber elasticity. On the other hand, iodine values less than 5 cannot provide the effect of epoxidization.

When the copolymers are block copolymers, they are preferably polystyrene-polybutadiene block copolymers, polystyrene-polybutadiene-polystyrene block copolymers (SBSs), polystyrene-polyisoprene-polystyrene block copolymers (SISs), or polyacrylonitrile-polybutadiene block copolymers (NBRs). The molecular structure of the block copolymers may be linear, branched, or radial. No limitation is imposed on the average molecular weight of the block copolymers; however, it is preferable to use block copolymers which have a low molecular weight and which do not dissolve in organic solvents. The terminal groups of the resins or rubber polymers serving as organic polymers to be epoxidized are not particularly limited.

The present invention is characterized in that the organic polymer to be epoxidized is in a solid state in an organic solvent. The expression "solid state" encompasses powders, granules, and similar forms.

Commercially available pellets per se may be used as the organic polymer to be epoxidized. However, in order to perform epoxidization reaction efficiently, the pellets are preferably pulverized to increase the surface area, with the particle diameter being as small as possible. For example, according to tests conducted by the present inventors, the epoxidization ratio (i.e., the percentage of epoxidized double bonds with respect to all double bonds) attained when pellet-shaped polymers are epoxidized was 20–50%, whereas when materials that had passed through a 4-mesh sieve or a 7.5-mesh sieve were epoxidized, epoxidization was 50–80% or 80–90%, respectively.

Pulverization may be performed through use of an ordinary mill. When the organic polymer to be epoxidized is a rubber polymer, the polymer is preferably pulverized by use of a freeze-pulverization method.

Epoxidization of the present invention is characterized in that an organic solvent is used for the purpose of dispersing or suspending the organic polymer to be epoxidized, and a peroxide is used as an epoxidizing agent to thereby epoxidize the organic polymer to be epoxidized directly in its own solid form.

The organic solvent should not dissolve the organic polymer to be epoxidized, or alternatively, the organic solvent should be used under reaction conditions in which the solubility of the organic polymer to be epoxidized is low. The reason is as follows: Generally speaking, when an organic polymer to be epoxidized is solid at normal ambient temperature and is dissolved in an organic solvent and epoxidized, the resultant epoxidized organic polymer that has been synthesized is to be recovered by a desolvating procedure. However, during this desolvating procedure, epoxidized products precipitate, making collection operation from the organic solvent difficult.

The organic solvent may be suitably selected in accordance with the species of the epoxidized organic polymer and reaction conditions of epoxidization. Examples of the organic solvent include linear or branched hydrocarbons such as hexane and octane, as well as their alkyl-substituted derivatives; alicyclic hydrocarbons such as cyclohexane and cycloheptane, as well as their alkyl-substituted derivatives; aromatic hydrocarbons such as benzene, naphthalene, toluene, and xylene, as well as alkyl-substituted aromatic hydrocarbons; aliphatic carboxylic esters such as methyl acetate and ethyl acetate; and halogenated hydrocarbons. Of these substances, preferred ones are cyclohexane, ethyl acetate, chloroform, toluene, xylene, hexane, etc. in consideration of solubility of the epoxidized organic polymer and ease of subsequent collection of the organic solvent.

The amount of the organic solvent used in the epoxidizing reaction is suitably determined in accordance with the species of the organic polymer to be epoxidized, the surface area, the species and amount of the catalyst which will be described hereunder, the epoxidizing reaction conditions, etc. Preferably, the amount of the organic solvent is in the range of one-half to five times on a weight basis, particularly preferably an equal amount to three times, that of the organic polymer to be epoxidized. If the amount is smaller than one-half, the organic polymer to be epoxidized cannot be sufficiently dispersed or suspended, whereas amounts greater than five times result in intricate desolvating procedure after completion of epoxidizing reaction and separation and recovery of the products.

Examples of peroxides serving as an epoxidizing agent include percarboxylic acids such as performic acid, peracetic acid, and perpropionic acid. These peroxides are preferably in their anhydride forms. However, epoxidization may also be performed in a system that uses peroxides containing $H_2O$ derived from hydrogen peroxide.

When percarboxylic acids are used as the epoxidizing agent, the percarboxylic acids are preferably dissolved in a solvent before use. Examples of usable solvents include hydrocarbons such as hexane, organic acid esters such as ethyl acetate, and aromatic hydrocarbons such as toluene. Use of a solvent is recommended, because solvents permeate inside the organic polymer to be epoxidized and accelerate epoxidizing reaction. Solvents for percarboxylic acids may be identical to those for dispersing the organic polymer to be epoxidized.

In use of peroxides derived from hydrogen peroxide, percarboxylic acid is first prepared by reacting hydrogen peroxide and a lower carboxylic acid such as formic acid or acetic acid, and the resultant percarboxylic acid, serving as an epoxidizing agent, is added to the reaction system so as to cause an epoxidizing reaction. Alternatively, epoxidizing reaction may be performed through use of hydrogen peroxide in the presence of a catalyst such as an osmate or tungstic acid, and a solvent. In the present invention, either method may used. In this connection, solvents which are usable in the latter case may be identical to those listed above as solvents for percarboxylic acids.

The oxygen concentration of oxirane of the epoxidized organic polymer can be controlled by varying the reaction molar ratio of the quantity of double bonds contained in the organic polymer to be epoxidized to the quantity of epoxidizing agent. The reaction molar ratio is suitably determined in accordance with the oxirane oxygen concentration of the target organic polymer to be epoxidized. However, the reaction molar ratio (a/b) of the quantity of double bonds contained in the organic polymer to be epoxidized (a) to the amount of peroxides reduced to the amount of pure peroxides (b) is preferably in the range of 1.0–2.0, particularly preferably 1.1–1.8.

The reaction temperature of epoxidization reaction is suitably determined in accordance with the species of the organic polymer to be epoxidized, the surface area, the species of the solvent, the species and amount of the epoxidizing agent, and the reaction conditions. Preferably, the reaction temperature is 20–80° C., and particularly preferably 30–60° C. Temperatures lower than 20° C. are not practical, as the reaction rate is slow. On the other hand, when the temperature is higher than 80° C., self-decomposition of peroxides becomes significant, which is not preferable. Although the reaction pressure is normally atmospheric pressure, slightly reduced or increased pressures may also be used.

The reaction time for epoxidization is suitably determined in accordance with the species of the organic polymer to be epoxidized, the surface area, the species of the solvent, the species and amount of the epoxidizing agent, and the reaction temperature. Preferably, the reaction time is 1–5 hours. If the reaction time is shorter than one hour, the conversion rate of double bonds is excessively low and is not preferable. On the other hand, if the reaction time is in excess of five hours, considerable addition reaction occurs between the epoxidized organic polymer and acetic acid—in the case in which acetic acid is used as a peroxide—causing a reduced yield, which is disadvantageous.

After completion of epoxidization reaction, an epoxidized organic polymer in a solid form exists in a dispersed or suspended state in an organic solvent in which byproducts and carboxylic acid are dissolved. According to a characteristic feature of the present invention, the epoxidized organic polymer is recovered in a solid form.

As used herein, the expression "recover in a solid form" refers to the operation in which an epoxidized organic polymer which has undergone epoxidizing reaction and which is present in a dispersed or suspended state i.e., in a solid form in the reaction mixture is recovered with its solid form being maintained. Accordingly, this expression does not encompass the case in which an epoxidized organic polymer is dissolved in a reaction mixture upon completion of epoxidization reaction and subsequently a desolvating operation is performed to thereby cause the polymer to precipitate in a solid form. In the present invention, epoxidizing reaction is performed while the solid state is maintained, and the resultant epoxidized organic polymer is also recovered in a solid state, to thereby produce epoxidized organic polymers with excellent workability.

In order to recover solid matter, the suspension may for example be subjected to filtration or centrifugal separation to thereby separate and recover a solid epoxidized organic polymer. Final products may be obtained by washing the thus-separated and recovered solid epoxidized organic polymer with water so as to remove the solvent, carboxylic acid, etc., and drying the washed material under reduced or reduced pressure, and with or without heating.

In accordance with the process of the present invention for producing epoxidized organic polymers, there can be produced epoxidized EPDMs, epoxidized SBSs, epoxidized SISs, epoxidized NBRs, epoxidized SBRs, epoxidized BRs, epoxidized isoprene rubber, epoxidized butyl rubber, etc. These compounds may be used as paints, resin modifiers, rubber modifiers, adhesives, resin compositions, etc.

(Thermoplastic Resin Compositions)

When the epoxidized EPDM obtained from the process of the present invention for epoxidized organic polymers—along with an organic compound having a functional group that reacts with an epoxy group, such as an acid anhydride—is incorporated into a thermoplastic resin and heat is applied, it is possible to obtain a thermoplastic resin composition having improved mechanical strength.

No particular limitation is imposed on the identity of the thermoplastic resin serving as a constituent of the thermoplastic resin composition of the present invention. For example, mention made be given of compounds that are used as molding materials, including polyolefin, polyvinyl chloride, polyvinylidne chloride, polyesters, polyamides, polycarbonates, polyvinyl acetate, polyacetal, polystyrene, ABS resins, methyl polymethacrylate, and fluorocarbon resins. Of these compounds, polyolefin is particularly preferred, and specific examples of polyolefin include homopolymers and copolymers of alpha-olefins such as ethylene, propylene, 1-butene, 1-pentene, 3-methyl-1-pentene, 1-hexene, 4-methyl-1-pentene, 1-heptene, and 1-octene; and copolymers of one of these alpha-olefins and small amounts of other copolymerizable monomers including (meth) acrylic esters such as vinyl acetate, acrylic acid, methacrylic acid, methyl acrylate, ethyl acrylate, methyl methacrylate, and ethyl methacrylate. Polypropylene is particularly preferred.

Epoxidized EPDM which is incorporated into the thermoplastic resin composition of the present invention preferably has an oxygen concentration in oxirane of 0.1–2.0% by weight, particularly preferably 0.11–1.75% by weight. If the concentration is lower than 0.1% by weight, effect of improving mechanical strength of the thermoplastic resin becomes poor, whereas use of starting EPDMs that realize an oxygen concentration in oxirane of more than 2.0% by weight is disadvantageous, as they are difficult to obtain. The ratios of copolymerization with ethylene, propylene, and diene compounds that constitute EPDM are not particularly limited. However, the ratios are preferably such that the iodine value falls within the range of 10–50.

The compounds having functional groups that react with epoxy groups—which compounds are used in the production of the thermoplastic resins of the present invention—have two or more functional groups. Alternatively, derivatives thereof may be used. Examples of such compounds include dicarboxylic acids, acid anhydrides, diamines, and diphenols.

Examples of dicarboxylic acids include aromatic dicarboxylic acids such as phthalic acid, isophthalic acid, terephthalic acid, and naphthalenedicarboxylic acid; aliphatic dicarboxylic acids such as oxalic acid, succinic acid, malonic acid, adipic acid, sebacic acid, and undecadicarboxylic acid; and alicyclic dicarboxylic acids such as tetrahydrophthalic acid.

Examples of acid anhydrides include maleic anhydrides, itaconic anhydrides, citraconic anhydrides, nadic anhydrides (endocis-bicyclo[2.2.1]hept-5-ene-2,3-dicarboxylic acid anhydrides), succinic anhydrides, phthalic anhydrides, tetrahydrophthalic anhydrides, hexahydrophthalic anhydrides, trimellitic anhydrides, head anhydrides (chlorine-containing derivatives of phthalic acid), himic anhydrides, methylhimich anhydrides (methylendomethylene tetrahydrophthalic anhydrides), adipic anhydrides, azelaic anhydrides, and sebacic anhydrides. Alicyclic acid anhydrides are particularly preferred.

Examples of diamines include stearylpropylene diamine, 1,4-bis(3-aminopropylpiperazine), and p-phenylene diamine.

Examples of diphenols include bisphenol A and bisphenol F.

The proportions of the above-described three ingredients that constitute the thermoplastic resin composition of the present invention are preferably such that epoxidized EPDM is used in an amount of 10–60 parts by weight, more preferably 30–50 parts by weight, with respect to 100 parts by weight of a thermoplastic resin, and that an acid anhydride is incorporated in an amount of 0.5–2 equivalent weights of the oxygen concentration of oxirane of the epoxidized EPDM.

The thermoplastic resin composition of the present invention may optionally contain, in addition to the aforementioned three ingredients, reinforcing agents such as glass, mica, and clay; pigments; a variety of stabilizers; antistatic agents; and nucleating agents.

The thermoplastic resin composition of the present invention is prepared by blending the above-described three ingredients with other additives, heating, and mixing. These steps are performed under stirring conditions. For this purpose, an extruder is usually used and the ingredients are kneaded therein. The resultant thermoplastic resin composition is obtained in the form of pellets. It is considered that mechanical strength of the thermoplastic resin is improved through heating and kneading, during which the functional groups possessed by the ingredients react with one another. Accordingly, there may be added a compound capable of serving as a catalyst, e.g., triphenylphosphine, a phosphoric ester, diazabicycloundecene (DBU), aluminum isopropoxide, etc.

(Primer Compositions)

Primer compositions may be obtained from the epoxidized EPDM prepared in accordance with the process of the present invention for producing epoxidized organic polymers and a chlorination product of a polypropylene resin modified with one, two, or more members selected from the group consisting of unsaturated carboxylic acids and their anhydrides.

The epoxidized EPDM used in the preparation of a primer composition preferably has an oxygen concentration in oxirane of 0.1–2.0% by weight, particularly preferably 0.11–1.75% by weight. If the concentration is below 0.1% by weight, interlayer adhesion to a topcoat layer is not sufficient, whereas starting EPDMs that realize an oxygen concentration in oxirane of more than 2.0% by weight are disadvantageous, as they are not readily available. The ratios of copolymerization with ethylene, propylene, and diene compounds that constitute EPDM are not particularly limited. However, the ratios are preferably such that an iodine value falls within the range of 10–50.

Chlorinated products of polyolefins that have been modified with unsaturated carboxylic acids or their anhydrides may be prepared through the process described hereunder.

Polyolefins that serve as starting materials of modified polyolefins, which have been modified with unsaturated carboxylic acids or their anhydrides, include crystalline polypropylene, noncrystalline polypropylene, polybutene-1, polypentene-1, poly4-methylpentene-1, low-density- or high-density -polyethylene, and ethylene/propylene copolymers. Of these, crystalline polypropylene is preferred. The polyolefins, being used singly or in combination of two or more, are made molten with heat, and if necessary, their viscosity is decreased through a thermal decomposition process. To the resultant polyolefin resin is added unsaturated carboxylic acid or an anhydride thereof in the presence of a radical generator, and subsequently, the addition product is dispersed or dissolved in a chlorinating solvent. Reaction is allowed to proceed in the presence of a catalyst or with irradiation of UV rays, at a temperature of 50–120° C., under atmospheric pressure or pressurized conditions while chlorine gas is blown.

Examples of unsaturated carboxylic acids or their anhydrides used for performing a modification reaction include maleic acid, maleic anhydrides, citraconic acid, citraconic anhydrides, fumaric acid, itaconic acid, and itaconic anhydrides. Of these, maleic anhydrides are preferred.

Examples of radical generators used in the modification reaction include, but are not limited to, peroxides such as di-tert-butyl peroxide, tert-butyl hydroperoxide, dicumyl peroxide, benzoyl peroxide, and methylethylketone peroxide; and azonitriles such as azobisisobutylonitrile and azobisisopropionitrile.

The saponification value, i.e. saponification degree (KOH Mg/g) of chlorination products which can be used in the present invention, i.e., chlorination products of polyolefin that has been modified with an unsaturated carboxylic acid or an anhydride thereof is not less than 6, and preferably 10–60 (measuring method: JIS K0070) . If the saponification value is lower than 6, compatibility with other resins is poor, inviting the risk of separation during the storage of primer solutions, or reduction in luster. On the other hand, if the saponification value is in excess of 60, adhesion with polyolefins such as polypropylene resins becomes poor.

The amount of grafting of the unsaturated carboxylic acid or an anhydride thereof is in the range of 0.5–3.0% by weight. If the amount of grafting is less than 0.5% by weight, interlayer adhesion to a topcoat becomes insufficient, whereas amounts in excess of 3.0% by weight cause poor paint storage stability and are not preferred.

The chlorination degree of polyolefins that have been modified with unsaturated carboxylic acids or anhydrides thereof is preferably in the range of 10–50% by weight, particularly preferably 15–35% by weight. (Measurement method: Specifically, NaOH solution, which is a chlorine-absorbable solution, is placed in a combustion flask, and the interior of the flask is purged with oxygen. Subsequently, a sample placed in a platinum basket is ignited and burned in the flask. After completion of combustion, the absorption liquid is titrated with silver nitride, and the chlorination degree is computed.) If the chlorination degree is lower than 10% by weight, the solution condition deteriorates, whereas if the chlorination degree is in excess of 50% by weight, adhesion to polyolefins may become poor.

The amount of the chlorination product of a polyolefin that has been modified with unsaturated carboxylic acid or an anhydride thereof is in the range of 50–70 parts by weight with respect to 100 parts by weight of epoxidized EPDM. If the amount of the chlorination product of a polyolefin that has been modified with unsaturated carboxylic acid or an anhydride thereof is less than 50 parts by weight, insufficient adhesion results, whereas if the amount is in excess of 70 parts by weight, the amount of epoxidized EPDM becomes less than 30 parts by weight, causing insufficient adhesion when the molded product to which the primer is applied is contaminated with a mold-releasing agent.

The primer composition of the present invention can be obtained by mixing, in a suitable solvent, epoxidized EPDM and a chlorination product of a polyolefin that has been modified with unsaturated carboxylic acid or an anhydride thereof. Solvents that may be used are preferably the same solvents that were employed in the production of the chlorination product of a polyolefin that has been modified with unsaturated carboxylic acid or an anhydride thereof. Also, the primer composition may contain 0–60 parts by weight of other resin components with respect to 100 parts by weight of a solid resin content excepting the solvent. Almost all types of resins generally used for the preparation of paints, such as acrylic resins, polyester resins, and urethane resins, can be used as co-usable resins.

The primer compositions of the present invention exhibit excellent adhesion even when molded products are contaminated with a mold-releasing agent. This effect is considered to be attributed to the chemical structure of epoxidized EPDM, which resembles that of mold-releasing agents and polypropylene bumper materials: the epoxidized EPDM comes to be compatible with the mold-releasing agent present on the surface and takes the agent into the coating film, to thereby exhibit improved adhesion properties.

(Unvulcanized Rubber Compositions and Rubber Moldings)

Unvulcanized rubber compositions and rubber moldings can be obtained from epoxidized EPDM, a diene polymer, and a vulcanizing agent.

The EPDM used in the present invention preferably has a number-average molecular weight of 2,000–40,000, particularly preferably 3,000–25,000. Moreover, the iodine value of the EPDM is preferably 5–100, particularly preferably 10–50. The reason is that materials falling within these ranges are readily available.

The oxygen concentration of oxirane of the epoxidized EPDM which is used in the present invention is preferably 0.1–2.0% by weight, particularly preferably 0.12–1.8% by weight. Within these ranges, remarkably excellent coating properties can be obtained.

The diene polymers which are used in the present invention may be homopolymers, random copolymers, or block copolymers.

When the block copolymers are formed of a vinyl aromatic hydrocarbon compound and a conjugate diene compound, the copolymerization ratio by weight of vinyl aromatic hydrocarbon compound/conjugate diene compound is preferably 20/80–70/30, particularly preferably 30/70–60/40. Within these ranges, unvulcanized rubber compositions or rubber moldings endowed with excellent coating characteristics can be obtained.

Vulcanizing agents which are used in the present invention include sulfur, metal oxides such as zinc oxide, and organic peroxides. Examples of organic peroxides include benzoyl peroxide, lauroyl peroxide, bis(t-butylperoxy)-3,3,5-trimethylcyclohexane.

When sulfur is used as the vulcanizing agent, it is preferable to use a cure accelerator in an amount of 20–150% by weight with respect to the vulcanizing agent. Examples of the cure accelerator include fatty acids and their derivatives such as stearic acid, oleic acid, lauric acid, and zinc stearate; and organic compounds such as diphenylguanidine, 2-mercaptobenzothiazole, tetramethylthiuram monosulfides, etc. Moreover, inorganic compounds such as zinc flower, zinc carbonate, and magnesium oxide may also be used. In the present invention, one, two, or more of these substances may be used.

The amount of the vulcanizing agent is preferably 0.2–2.5 parts by weight, particularly preferably 0.5–2.0 parts by weight, when the amount in total of the diene polymer and epoxidized EPDM is 100 parts by weight.

The rubber compositions of the present invention may contain, as a filler, plastic fiber, glass fiber, wollastonite, diatomaceous earth, wood powder, natural calcium silicate, asbestos powder, talc, calcium carbonate, kaolin, celite, etc. The amount of the filler is preferably 1–60 parts by weight, particularly preferably 5–40 parts by weight, when the amount in total of the diene polymer and epoxidized EPDM is 100 parts by weight. In the present invention, one of these fillers may be used singly, or two or more of these fillers may be in combination.

The unvulcanized rubber compositions of the present invention may be molded through extrusion, compression molding, etc. Extrusion is particularly preferred. The extrudates may be vulcanized, or in other words, treated with heat, to cause crosslinking within the unvulcanized rubber composition so as to produce rubber moldings.

In the case in which a paint is applied to the unvulcanized rubber composition of the present invention, application of the paint may be performed after vulcanization and before curing. Alternatively, application of the paint may be effected before vulcanization, and vulcanization and curing of the paint may be performed simultaneously.

Paints that may be applied to the unvulcanized rubber compositions of the present invention include urethane paints, acrylic resin paints, and polyester paints. Of these paints, urethane paints are particularly preferable. Specifically, solvent-free urethane paints which are constituted by two liquids, i.e., a polyol ingredient that has a terminal OH group and an isocyanate ingredient, are preferred. One-liquid-type paints in which a block-type isocyanate has been blended with a polyol ingredient may also be used.

The paints are preferably of the completely solvent-free type. If addition of solvent is sought, a solvent having a boiling point of not lower than 150° C. may be added in an amount of less than 20% by weight. Such an amount will not cause foaming of coating film attributable to the heat of the vulcanized layer, or deteriorated appearance or reduced friction resistance which may result from the foaming of coating film.

EXAMPLES

The present invention will next be described by way of examples. However, the present invention is not limited only to the examples described hereunder, so long as the scope of the invention is not surpassed. In the following descriptions, "parts" and "%" are all based on a weight basis.

A. Production of Epoxidized Organic Polymers (Measuring Method)

(1) Oxygen concentration of oxirane: Measured in accordance with ASTM-1652.

(2) Acid value: JIS K-0070

Example 1

In a four-necked flask (capacity: 1 liter) equipped with a stirrer, thermometer, dropping funnel, and reflux condenser were placed 100 g of a pulverized product of EPDM (iodine number: 10) which had passed through a 7.5 mesh sieve (number-average molecular weight of the product as measured by the GPC method: 5,300) and 200 g of ethyl acetate (serving as a solvent), and the contents were stirred and thoroughly mixed so as to disperse EPDM. The mixture was heated to 50° C., and with the temperature being maintained at 50° C., 12.0 g of 30% ethyl acetate solution of peracetic acid was added to the flask through the dropping funnel over approximately 30 minutes so as to cause a reaction. The reaction mixture was allowed to ripen for 3 hours at the same temperature.

After completion of ripening, solid matter was recovered by filtration, washed with deionized water in an amount 3 times that of the reaction mixture on a weight basis, to thereby remove acetic acid derived from peracetic acid. Subsequently, in order to remove water and other substances, the reaction mixture was brought to dryness under reduced pressure to obtain 99.0 g of an epoxidized EPDM. The thus-obtained epoxidized EPDM had an oxirane oxygen concentration of 0.27% and acid value of 0.30.

Example 2

In the same type of a four-necked flask as that used in Example 1 were placed 100 g of a pelletized product of EPDM (iodine number: 10) available on the market(number-average molecular weight of the product as measured by the GPC method: 5,300) and 200 g of ethyl acetate (serving as a solvent), and the contents were stirred and thoroughly mixed so as to disperse EPDM. The mixture was heated to 50° C., and with the temperature being maintained at 50° C., 12.0 g of 30% ethyl acetate solution of peracetic acid was added to the flask through the dropping funnel over approximately 30 minutes so as to cause a reaction. The reaction mixture was allowed to ripen for 3 hours at the same temperature.

After completion of ripening, solid matter was recovered by filtration, washed with deionized water in an amount 3 times that of the reaction mixture on a weight basis, to thereby remove acetic acid derived from peracetic acid. Subsequently, in order to remove water and other substances, the reaction mixture was brought to dryness under reduced pressure to obtain 100.0 g of an epoxidized EPDM. The thus-obtained epoxidized EPDM had an oxirane oxygen concentration of 0.20% and acid value of 0.20.

Example 3

In the same type of a four-necked flask as that used in Example 1 were placed 100 g of a pulverized product of EPDM (iodine number: 10) which had passed through a 7.5 mesh sieve (number-average molecular weight of the product as measured by the GPC method: 5,300), 200 g of ethyl acetate (serving as a solvent), and 2.88 g of 90% formic acid, and the contents were stirred and thoroughly mixed so as to disperse EPDM. The mixture was heated to 50° C., and 5.32 g of aqueous hydrogen peroxide having 30% of purity was added to the flask through the dropping funnel over approximately 10 minutes so as to cause a reaction. The reaction mixture was allowed to ripen for approximately 4 hours at the same temperature.

After completion of ripening, solid matter was recovered by filtration, washed with deionized water in an amount 3 times that of the reaction mixture on a weight basis, to thereby remove carboxylic acid derived from peracid. Subsequently, in order to remove water and other substances, the reaction mixture was brought to dryness under reduced pressure to obtain 99.0 g of an epoxidized EPDM. The thus-obtained epoxidized EPDM had an oxirane oxygen concentration of 0.27% and acid value of 0.70.

Example 4

In a four-necked flask (capacity: 3 liters) equipped with a stirrer, thermometer, dropping funnel, and reflux condenser were placed 300 g of a block-copolymer of SBS (a substance obtained by freezing and pulverizing TR2000 (manufactured by Japan Synthetic Rubber Co., Ltd.) )which had passed through a 7.5 mesh sieve and 600 g of hexane, and the contents were stirred and thoroughly mixed so as to suspend SBS. The mixture was heated to 40° C., and 199 g of 30% ethyl acetate solution of peracetic acid was continuously added to the flask through the dropping funnel, the mixture being epoxidized for 3 hours at 40° C. while stirring.

After completion of reaction, solid matter was recovered from the reaction mixture by filtration and was subsequently washed with deionized water. The thus-recovered solid matter was subjected to removal of water and residual solvent therefrom under reduced pressure to obtain 290 g of an epoxidized SBS. The thus-obtained epoxidized SBS had an oxirane oxygen concentration of 3.07% and acid value of 0.55.

Example 5

In the same type of a four-necked flask as that used in Example 4 were placed 300 g of pellets of a block-copolymer of SBS (TR2000 manufactured by Japan Synthetic Rubber Co., Ltd.) and 600 g of hexane, and the contents were stirred and thoroughly mixed so as to suspend SBS. The mixture was heated to 40° C., and 199 g of 30% ethyl acetate solution of peracetic acid was continuously added to the flask through the dropping funnel, the mixture being epoxidized for 3 hours at 40° C. while stirring.

After completion of reaction, solid matter was recovered from the reaction mixture by filtration and was subsequently washed with deionized water. The thus-recovered solid matter was subjected to removal of water and residual solvent therefrom under reduced pressure to obtain 298 g of an epoxidized SBS. The thus-obtained epoxidized SBS had an oxirane oxygen concentration of 1.01% and acid value of 0.23.

Example 6

In the same type of a four-necked flask as that used in Example 4 were placed 300 g of NBR (a substance obtained by freezing and pulverizing Nipol 1043 (a random copolymer; manufactured by Nippon Zeon Co. Ltd.)) which had passed through a 7.5 mesh sieve and 600 g of hexane, and the contents were stirred and thoroughly mixed so as to suspend NBR. The mixture was heated to 40° C., and 301 g of 30% ethyl acetate solution of peracetic acid was continuously added to the flask through the dropping funnel, the mixture being epoxidized for 3 hours at 40° C. while stirring.

After completion of reaction, solid matter was recovered from the reaction mixture by filtration and was subsequently washed with deionized water. The thus-recovered solid matter was subjected to removal of water and residual solvent therefrom under reduced pressure to obtain 275 g of an epoxidized NBR polymer (a random copolymer). The thus-obtained epoxidized NBR had an oxirane oxygen concentration of 4.31% and acid value of 0.34.

Example 7

In the same type of a four-necked flask as that used in Example 4 were placed 300 g of a block-copolymer of SIS (a substance obtained by freezing and pulverizing QUINTAC 3422 (manufactured by Nippon Zeon Co., Ltd.)) which had passed through a 7.5 mesh sieve and 600 g of hexane, and the contents were stirred and thoroughly mixed so as to suspend SIS. The mixture was heated to 40° C., and 134 g of 30% ethyl acetate solution of peracetic acid was continuously added to the flask through the dropping funnel, the mixture being epoxidized for 3 hours at 40° C. while stirring.

After completion of reaction, solid matter was recovered from the reaction mixture by filtration and was subsequently washed with deionized water. The thus-recovered solid matter was subjected to removal of water and residual solvent therefrom under reduced pressure to obtain 290 g of an epoxidized SIS polymer. The thus-obtained epoxidized SIS had an oxirane oxygen concentration of 1.96% and acid value of 0.28.

Example 8

In the same four-necked flask as that used in Example 4 were placed 300 g of a polymer of BR (a substance obtained by freezing and pulverizing BR-01 (manufactured by Japan Synthetic Rubber Co., Ltd.)) which had passed through a 7.5 mesh sieve and 600 g of hexane, and the contents were stirred and thoroughly mixed so as to suspend BR. The mixture was heated to 40° C., and 235 g of 30% ethyl acetate solution of peracetic acid was continuously added to the flask through the dropping funnel, the mixture being epoxidized for 3 hours at 40° C. while stirring.

After completion of reaction, solid matter was recovered from the reaction mixture by filtration and was subsequently washed with deionized water. The thus-recovered solid matter was subjected to removal of water and residual solvent therefrom under reduced pressure to obtain 281 g of an epoxidized BR polymer. The thus-obtained epoxidized BR had an oxirane oxygen concentration of 3.38% and acid value of 0.30.

Example 9

In a four-necked flask (capacity: 6,000 milliliters) equipped with a thermometer, stirrer, and reflux condenser were placed 1,500 g of a pulverized product of EPDM (iodine number: 20; number-average molecular weight: 5,300) which had passed through a 7.5 mesh sieve (number-average molecular weight of the product as measured by the GPC method: 5,300) and 3,000 g of ethyl acetate (serving as a solvent), and the contents were stirred and thoroughly mixed so as to disperse EPDM. The mixture was heated to 50° C., and with the temperature being maintained at 50° C., 450 g of 30% ethyl acetate solution of peracetic acid was added to the flask through the dropping funnel over approximately 30 minutes so as to cause a reaction. The reaction mixture was allowed to ripen for 3 hours at the same temperature. After completion of ripening, solid matter was recovered by filtration, washed with deionized water in an amount 3 times that of the reaction mixture on a weight basis, to thereby remove acetic acid derived from peracetic acid. Subsequently, the reaction mixture was subjected to removal of the solvent therefrom under reduced pressure to obtain 1,485 g of an epoxidized EPDM. The thus-obtained epoxidized EPDM had an oxirane oxygen concentration of 0.9% and acid value of 0.8.

Comparative Example 1

In the same type of a four-necked flask as that used in Example 1 were placed 50 g of pelletized EPDM (iodine number: 10) and 450 g of toluene (serving as a solvent), and the contents were stirred so as to dissolve EPDM. The mixture was heated to 50° C., and 6.0 g of 30% ethyl acetate solution of peracetic acid was added to the flask through the dropping funnel over approximately 20 minutes so as to cause a reaction. The reaction mixture was allowed to ripen for 3 hours at a reaction temperature of 50° C.

After completion of ripening, the reaction mixture was washed with deionized water in an amount 3 times that of the reaction mixture on a weight basis, to thereby remove acetic acid derived from peracetic acid. An epoxidized EPDM precipitated during removal of the solvent. Subsequently, in order to remove water and other substances, the reaction mixture was brought to dryness under reduced pressure to obtain 49.2 g of an epoxidized EPDM. The thus-obtained epoxidized EPDM had an oxirane oxygen concentration of 0.31% and acid value of 0.30.

B. Thermoplastic Resin Compositions

Examples 10 and 11

Polypropylene (NOBLEN H-501 manufactured by Sumitomo Chemical Co., Ltd.), an epoxidized EPDM which had been obtained in accordance with Example 9, an acid anhydride (Methylhimich anhydride manufactured by Hitachi Chemical Co., Ltd.), and triphenylphosphine were mixed such that all the substances except triphenylphosphine were mixed at proportions (parts by weight) indicated in Table 1 while triphenylphosphine was mixed at a proportion of 1 part by weight based on 100 parts by weight of the epoxidized EPDM. The resulting mixtures were melted and kneaded with an extruder (at a temperature of 210° C.). The thus-obtained resin compositions were cooled and then pelletized. The pellets were pressed into test pieces for use in a mechanical strength test. The test results are shown in Table 1. As seen from Table 1, the thermoplastic resin compositions of the present invention can improve impact strength without decreasing tensile strength.

TABLE 1

|  | Example 10 | Example 11 | Comparative Sample 1 | Comparative Sample 2 |
|---|---|---|---|---|
| Polypropylene | 100 | 100 | 100 | 100 |
| Epoxidized EPDM | 40 | 20 | 30 | |
| Acid anhydride | 4 | 2 | | 3 |
| Impact strength (kg · cm/cm) | 6 | 5 | 2 | 2 |
| Tensile strength (kgf/cm) | 410 | 430 | 250 | 350 |
| Hardness | 102 | 100 | 75 | 95 |

(Measuring Methods)
(1) Izod impact strength: JIS K6758 (23° C.)
(2) Tensile strength: JIS K6755 (breaking strength)
(3) Hardness: JIS K6758 (Rockwell R)

C. Primer Compositions

Example 12

Through use of the epoxidized EPDMs of Examples 1 and 2 and products of chlorination of a polypropylene modified with maleic anhydride (abbreviated as chlorinated modified PP in Table 2) of Synthesis Examples 1 and 2 described below, samples 1 to 3 and comparative samples 1 and 2 of a primer composition were prepared in accordance with Table 2

The primer compositions were applied onto respective backing materials of polypropylene (TX-1180 manufactured by Mitsubishi Chemical Corp.) with an air spray gun so as to form a film having a thickness of 10 μm thereon. The thus-coated backing materials were allowed to stand for 10 minutes at room temperature. Subsequently, a urethane paint (LETAN PG2 KM CLEAR manufactured by Kansai Paint Co., Ltd.) was applied in the same manner onto the coated backing materials so as to attain a film thickness of 25 μm, followed by drying for 20 minutes at 120° C.

Physical properties of the thus-formed films and storage stability of the prepared paints were evaluated. Evaluation results are shown in Table 2.

Synthesis Example 1

500 g of isotactic polypropylene (melt viscosity at 180° C.: approximately 2,500 cps) was placed in a three-necked flask equipped with a stirrer, dropping funnel, and a condenser tube for refluxing a monomer. The flask was placed in an oil bath which was maintained at a constant temperature of 180° C. to thereby melt isotactic polypropylene completely. Subsequently, the interior atmosphere of the flask was replaced with nitrogen for approximately 10 minutes. Then, 20 g of maleic anhydride was added to the flask over approximately 5 minutes. Next, 2g of di-tert-butyl peroxide was dissolved in 10 ml of heptane. The resulting solution was added to the flask through the dropping funnel over approximately 30 minutes. With the interior temperature of the flask being maintained at 180° C., reaction was continued for approximately another 1 hour. Subsequently, while the interior pressure of the flask was being reduced through use of an aspirator, unreacted maleic anhydride was removed over approximately 30 minutes. The thus-obtained product had a saponification value of 25.

To 300 g of this product was added 5 liters of carbon tetrachloride, followed by dissolution at 110° C. under a chlorine gas pressure of 2 kg/cm$^2$. Subsequently, while the solution was being irradiated with ultraviolet rays, gaseous chlorine was bubbled thereinto from the bottom portion of the reactor until the degree of chlorination became 25% by weight. After completion of reaction, carbon tetrachloride (serving as a solvent) was removed with an evaporator, followed by replacement with toluene, thereby obtaining 20% by weight toluene solution of a product of chlorination of a polypropylene modified with a maleic anhydride. The product of chlorination (solid matter) had a saponification value of 24.

Synthesis Example 2

A polypropylene modified with a maleic anhydride having a saponification value of 36 was obtained from 500 g of isotactic polypropylene used in Synthesis Example 1 through use of 30 g of maleic anhydride and 2 g of di-tert-butyl peroxide in a manner similar to that of Synthesis Example 1. Subsequently, a chlorination reaction was performed in accordance with Synthesis Example 1, thereby obtaining 20% by weight toluene solution of a product of chlorination (degree of chlorination: 25% by weight) of a polypropylene modified with a maleic anhydride. The product of chlorination (solid matter) had a saponification value of 34.

(Results)

As shown in Table 2, as compared with comparative samples 1 and 2 representing a comparative primer composition, significantly improved properties were exhibited by samples 1 to 3 representing a primer composition of the present invention which was prepared through use of an epoxidized EPDM, i.e., an epoxidized organic polymer produced by the process of the present invention.

TABLE 2

|  | Sample 1 | Sample 2 | Sample 3 | Comparative Sample 1 | Comparative Sample 2 |
|---|---|---|---|---|---|
| Epoxidized EPDM (Example 1: parts) | 100 | 100 |  |  | 100 |
| Epoxidized EPDM (Example 2: parts) |  |  | 100 | 100 |  |
| Chlorinated modified PP (Synthesis Example 1: parts) | 66 | 60 |  |  |  |
| Chlorinated modified PP (Synthesis Example 2: parts) |  |  | 55 | 30 | 40 |
| Degree of chlorination of chlorinated modified PP (% by weight) | 25 | 25 | 25 | 25 | 25 |
| Physical properties of film |  |  |  |  |  |
| Adhesion | 25/25 | 25/25 | 25/25 | 25/25 | 0/25 |
| Adhesion against water | 25/25 | 25/25 | 25/25 | 25/25 | 0/25 |
| Film stickiness | 0 | 0 | 0 | 0 | 0 |
| Storage stability of paint | 0 | 0 | 0 | Crystalline blobbing | 0 |

(Measuring Methods)

(1) Adhesion: The film surface of each test piece was cut crisscrossed at 2mm intervals so as to form 25 squares. Subsequently, adhesive tape was stuck on the film surface and was then peeled off upward at a stroke. Unremoved squares were counted and represented as a ratio to the total number of squares (25) for evaluation.

(2) Adhesion against water: Test pieces were immersed in warm water having a temperature of 40° C. for 240 hours. Subsequently, the test pieces underwent measurement similar to that in (1) "Adhesion" above to thereby evaluate their adhesion against water.

(3) Film stickiness: After preparation of test pieces, they were tactually tested for stickiness with a finger to thereby evaluate film stickiness thereof. The absence of stickiness was indicated by "O," and the presence of stickiness was indicated by "X."

(4) Storage stability: Compositions were allowed to stand for 14 days at 60° C. Subsequently, they were visually checked for crystalline blobbing. The absence of crystalline blobbing was indicated by "O."

(5) Bonding force: Each of vulcanized samples was cut into two pieces, each measuring 5 mm (width)×100 mm (length)×1.5 mm (thickness). The thus-obtained two pieces were bonded together with a bonding agent (the instantaneous bonding agent "ZERO TIME" manufactured by Cemendine Corporation Ltd.) such that smooth urethane surfaces thereof faced each other. The bonding force of the thus-bonded two pieces was measured through use of a TENSILON type tensile tester manufactured by Shimazu Corporation.

D. Unvulcanized Rubber Compositions

Example 13

Through use of an epoxidized EPDM which had been obtained in accordance with Example 9, unvulcanized rubber compositions were manufactured in accordance with formulations shown in Table 3. Each of the thus-obtained unvulcanized rubber compositions was extruded to obtain extrudates. The extrudates were vulcanized and then coated with a urethane paint obtained below in Reference Example. The thus-coated extrudates were tested for bonding force and state of separation. The results are shown in Table 3.

(Reference Example: Preparation of Urethane Paints)

To a urethane resin component which had been obtained from two liquids consisting of 100 parts by weight of an polyol component (PU-5106 manufactured by Toa Gosei Co., Ltd.) having a terminal OH group in the molecule and 100 parts by weight of an isocyanate component (PU-1300 manufactured by Toa Gosei Co., Ltd.) were added 10 parts by weight of dimethyl silicone oil (TSF451–1OM manufactured by Toshiba Silicone Corporation Ltd.; 100,000 cps) serving as a liquid lubricant, 10 parts by weight of fluorine-contained resin powder (L180J manufactured by Asahi Glass Co., Ltd.; grain size: 20–100 $\mu$m) serving as a solid lubricant, 5 parts by weight of molybdenum disulfide, 10 parts by weight of grains of nylon (average grain size: 50 $\mu$m), and 5 parts by weight of grins of polyethylene (average grain size: 50 $\mu$m), to thereby prepare a solvent-free urethane paint.

(Results)

A comparative composition had a bonding force of 0.3 kg/cm or less, and its smooth urethane layer which had been formed through application of a urethane paint exhibited interface separation. It is not shown in Table 3, but when an epoxidized EPDM was added in an amount of 80 parts by weight or more, it reacted with a cure accelerator, resulting in slowdown of vulcanization and an approximately 10% reduction of tearing strength.

TABLE 3

| (Parts by weight) | Comparative sample | Sample 1 | Sample 2 | Sample 3 | Sample 4 |
|---|---|---|---|---|---|
| Epoxidized EPDM | — | 20 | 40 | 60 | 70 |
| SBR | 75 | 80 | 60 | 40 | 30 |
| EPDM | 25 | — | — | — | — |
| Zinc flower |  | 4 |  |  |  |
| Stearic acid |  | 2 |  |  |  |
| CaO |  | 5 |  |  |  |
| FEF carbon |  | 65 |  |  |  |
| Calcium bicarbonate |  | 30 |  |  |  |
| Paraffin oil |  | 30 |  |  |  |
| Sulfur |  | 1.5 |  |  |  |
| Cure accelerator |  | 4.0 |  |  |  |
| Bonding force (kg/cm) | 0.25 | 1.2 | 1.2 | 1.2 | 1.2 |
| State of separation | Interface separation | Base material separation | Base material separation | Base material separation | Base material separation |

(Measuring Method)

State of separation: The state of separation was visually observed. After separation, when only a film adhered to a test piece, it was judged as interface separation; when a base material adhered to a test piece, it was judged as base material separation.

Industrial Applicability

1. The process of the present invention for producing an epoxidized organic polymer exerts specially advantageous effects as described below and therefore, its industrial utility is quite remarkable. That is, according to the process of the present invention, an organic polymer to be epoxidized, such as a resin or rubber polymer, which has double bonds in the molecule and which is solid at normal ambient temperature can be readily epoxidized in an unhomogeneous system by simply dispersing or suspending the polymer in a solvent, with the necessity of dissolving the polymer being eliminated. Also, according to the process of the present invention, the organic polymer to be epoxidized is dissolved or suspended in a solvent for epoxidization, and the produced epoxidized organic polymer can be recovered in a solid form. Therefore, the post-treatment operation is simple, workability is improved, and in addition, the product can be obtained at a high recovery ratio.

2. The thermoplastic resin composition of the present invention has greatly improved mechanical strength as compared with its constituent starting thermoplastic resin.

3. The primer composition of the present invention exhibits exellent storage stability and remarkable adhesion to moldings and materials of polyolefin such as polypropylene as well as to topcoats. Moreover, the composition also exhibits excellent adhesion even when moldings are contaminated with mold-releasing agents.

4. According to the present invention, there is provided an unvulcanized rubber composition comprising a diene polymer and an epoxidized EPDM, rubber moldings formed of the composition, and a process for the production of the rubber moldings. Since the unvulcanized rubber composition of the present invention exhibits excellent coating ability, rubber moldings having complicated shapes can be produced with ease.

What is claimed is:

1. A primer composition comprising 100 parts by weight of an epoxidized EPDM and 50 to 70 parts by weight of a chlorination product of a polyolefin modified with an unsaturated carboxylic acid or an anhydride thereof.

2. The primer composition according to claim 1, wherein the oxygen concentration in oxirane of the epoxidized EPDM is 0.1–2.0% by weight.

3. The primer composition according to claim 1, wherein the chlorination product of a polyolefin modified with an unsaturated carboxylic acid or an anhydride thereof has a saponification degree of 10–60 (KOH mg/g) and is obtained through chlorination of a polyolefin which has been modified with an unsaturated carboxylic acid or an anhydride thereof so as to have a chlorination degree of 15–35% by weight.

4. The primer composition according to claim 1, which is applied to polyolefin.

5. The primer composition according to claim 2, wherein the chlorination product of a polyolefin modified with an unsaturated carboxylic acid or an anhydride thereof has a saponification degree of 10–60 (KOH mg/g) and is obtained through chlorination of a polyolefin which has been modified with an unsaturated carboxylic acid or an anhydride thereof so as to have a chlorination degree of 15–35% by weight.

6. The primer composition according to claim 2, which is applied to polyolefin.

7. The primer composition according to claim 3, which is applied to polyolefin.

8. A primer composition comprising 100 parts by weight of an epoxidized EPDM and 50 to 70 parts by weight of a chlorination product of a polyolefin modified with an unsaturated carboxylic acid or an anhydride thereof, wherein the epoxidized EPDM is produced by a process comprising dispersing or suspending an EPDM in an organic solvent and epoxidizing the EPDM with a peroxide so as to have an oxygen concentration in oxirane of 0.1–2.0% by weight.

9. The primer composition according to claim 8, wherein the chlorination product of a polyolefin modified with an unsaturated carboxylic acid or an anhydride thereof has a saponification degree of 10–60 (KOH mg/g) and is obtained through cholorination of a polyolefin which has been modified with an unsaturated carboxylic acid or an anhydride thereof so as to have a chlorination degree of 15–35% by weight.

10. A primer composition comprising 100 parts by weight of an epoxidized EPDM and 50 to 70 parts by weight of a chlorination product of a polyolefin modified with an unsaturated carboxylic acid or an anhydride thereof, wherein the epoxidized EPDM is produced by a process comprising dispensing or suspending an EPDM having an iodine value of 10–50 in an organic solvent and epoxidizing the EPDM with a peroxide so as to have an oxygen concentration in oxirane of 0.1–2.0% by weight, and wherein the chlorination product of a polyolefin modified with an unsaturated carboxylic acid or an anhydride thereof has a saponification degree of 10–60 (KOH mg/g) and is obtained through chlorination of a polyolefin which has been modified with an unsaturated carboxylic acid or an anhydride thereof so as to have a chlorination degree of 15–35% by weight.

11. The primer composition according to claim 12, which is applied to polyolefin.

* * * * *